(No Model.)
J. J. ASTOR, Jr.
BICYCLE BRAKE.
No. 417,401. Patented Dec. 17, 1889.
Fig. 1.
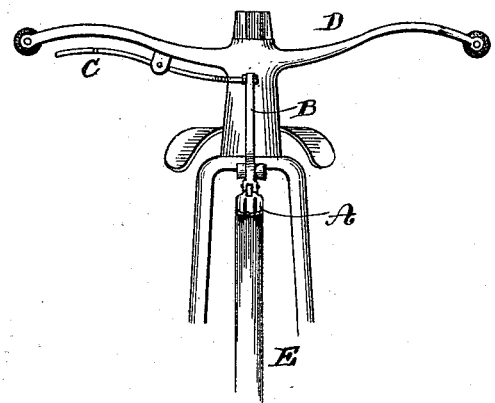
Fig. 3.
Fig. 2.
Fig. 5.
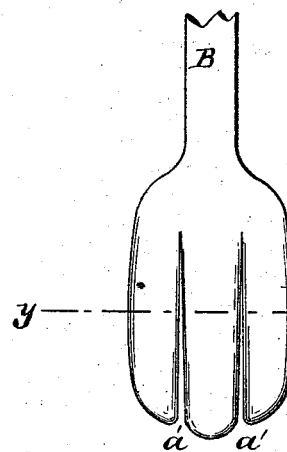
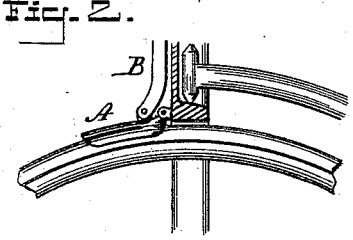
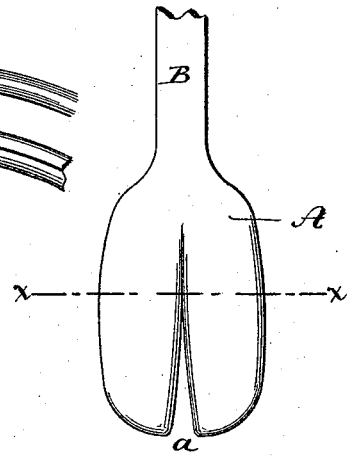
Fig. 4.
Fig. 6.
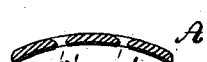
WITNESSES:
D. D. Mott
C. Sedgwick
INVENTOR:
J. J. Astor Jr
BY
Munn & Co
ATTORNEYS.
N. PETERS, Photo-Lithographer, Washington, D. C.

UNITED STATES PATENT OFFICE.

JOHN J. ASTOR, JR., OF NEW YORK, N. Y.

BICYCLE-BRAKE.

SPECIFICATION forming part of Letters Patent No. 417,401, dated December 17, 1889.

Application filed May 20, 1889. Serial No. 311,355. (No model.)

*To all whom it may concern:*

Be it known that I, JOHN JACOB ASTOR, Jr., of the city, county, and State of New York, have invented a new and Improved Bicycle-Brake, of which the following is a specification, reference being had to the annexed drawings, forming a part thereof, in which—

Figure 1 is a front elevation of a part of a bicycle, showing the application of my improved brake. Fig. 2 is a side elevation of the same. Fig. 3 is a plan view of one form of my improved bicycle-brake shoe. Fig. 4 is a transverse section of the same, taken on line $x\,x$ in Fig. 3. Fig. 5 is a plan view of another form of the brake-shoe, and Fig. 6 is a transverse section taken on line $y\,y$ in Fig. 5.

Similar letters of reference indicate corresponding parts in all the views.

It is well known that the soft-rubber tire of a bicycle-wheel, which is circular in cross-section when first applied to the wheel, soon becomes worn in use, so as to present a flat zone to the bicycle-brake. The brake, being adapted to a circularly-convex tire, fulfills its office when the tire is new and enables the rider to retain full control of his machine; but when the tire becomes worn in the manner described the brake no longer adapts itself to the entire periphery of the tire, but touches only upon the sides, thereby affording only a small frictional surface, which is insufficient for the control of the machine. To obviate this difficulty and to provide a brake which will adapt itself with equal advantage to either a new or a worn tire is the object of my invention.

My invention consists in a bicycle-brake shoe made of spring metal and slotted longitudinally, so as to cause it to adapt itself to the periphery of the tire without regard to its cross-sectional shape.

In carrying out my invention I make the brake-shoe A of spring material, preferably of tempered steel, and in the process of manufacture I give it the required form by means of a drop-press or by some analogous method, and I make in the brake-shoe a longitudinal slit $a$, as shown in Fig. 3, or two or more longitudinal slits $a'$, as shown in Fig. 5. The outer edges of the brake-shoe and the edges along the slits $a\,a'$ are rounded, as shown in the cross-sectional views, to prevent the shoe from injuring the soft-rubber tire of the bicycle-wheel. The brake-shoe A is pivoted to the fork which supports the wheel E, and is connected with the brake-lever C by a rod B in the usual way. The brake-shoe is brought to bear upon the periphery of the bicycle-wheel E by pressing the brake-lever C more or less. The several divisions of the brake-shoe are allowed to act independently of each other, each producing its due proportion of friction, thereby rendering the whole of the periphery of the tire available as a frictional surface upon which the brake-shoe may act.

By the employment of my improved brake-shoe many of the mishaps incident to bicycle-riding may be avoided, as it provides means for maintaining perfect control over the machine.

Having thus described my invention, I claim as new and desire to secure by Letters Patent—

1. A bicycle-brake shoe made of spring material and slotted longitudinally to enable it to conform to bicycle-tires of different shapes, substantially as specified.

2. A bicycle-brake shoe of curved cross-section provided with longitudinal slits extending from the free end of the shoe inward, substantially as specified.

3. A bicycle-brake shoe slotted longitudinally and provided with rounded edges around the periphery and along the slots, substantially as specified.

JOHN J. ASTOR, JR.

Witnesses:
C. SEDGWICK,
EDWD. M. CLARK.